(12) United States Patent
Chandler et al.

(10) Patent No.: US 8,475,563 B2
(45) Date of Patent: Jul. 2, 2013

(54) METHOD OF TREATING A GAS SYSTEM

(75) Inventors: Philip Chandler, San Francisco, CA (US); Christopher Peter Jones, Swindon (GB); Patrick Fletcher, Wroughton (GB); Christopher Germain, Clevedon (GB)

(73) Assignee: Edwards Limited (GB)

( * ) Notice: Subject to any disclaimer, the term of this patent is extended or adjusted under 35 U.S.C. 154(b) by 534 days.

(21) Appl. No.: 12/518,538

(22) PCT Filed: Nov. 28, 2007

(86) PCT No.: PCT/GB2007/050726
§ 371 (c)(1),
(2), (4) Date: Jan. 15, 2010

(87) PCT Pub. No.: WO2008/072006
PCT Pub. Date: Jun. 19, 2008

(65) Prior Publication Data
US 2010/0139481 A1    Jun. 10, 2010

(30) Foreign Application Priority Data

Dec. 14, 2006    (GB) .................................. 0624931.2

(51) Int. Cl.
*B01D 53/14*    (2006.01)
(52) U.S. Cl.
USPC .............. 95/9; 95/11; 95/13; 95/196; 95/205; 95/230; 95/233; 96/234; 96/240; 96/244
(58) Field of Classification Search
USPC .............. 95/3, 8, 11, 13, 188, 195–196, 205, 95/230, 233, 9; 96/234, 240, 244
See application file for complete search history.

(56) References Cited

U.S. PATENT DOCUMENTS

| | | | |
|---|---|---|---|
| 3,554,895 A * | 1/1971 | McRae et al. | 204/631 |
| 4,643,886 A | 2/1987 | Chang et al. | |
| 4,795,565 A * | 1/1989 | Yan | 210/669 |

(Continued)

FOREIGN PATENT DOCUMENTS

EP    0 680 932 A2    11/1995

*Primary Examiner* — Duane Smith
(74) *Attorney, Agent, or Firm* — Shumaker & Sieffert, P.A.

(57) ABSTRACT

In a method of treating a gas stream, an aqueous scrubbing liquor is circulated through an essentially closed loop (20) comprising an electrochemical unit (48) for reducing the acidity of the liquor. A portion of the circulating liquor is diverted away from the closed loop (20) to a gas scrubbing unit (10). The gas stream enters the scrubbing unit (10), wherein an acid, for example HF and solid particulates, for example $SiO_2$ particulates, within the gas stream dissolve in the diverted liquor. The diverted liquor is subsequently returned to the closed loop (20), and is replenished in the scrubbing unit (10) by fresh liquor diverted from the closed loop (20). A device (46) is provided for monitoring the acidity of the liquor at a location within the closed loop (20). The reduction in the acidity of the liquor by the electrochemical cell (48) is controlled depending on the monitored concentration. By controlling the acidity of the liquor, the solubility of the solid particulates within the diverted portion of the liquor may be optimised. This can increase the lifetime of one or more filter cartridges (42) located in the closed loop (20) upstream from the electrochemical unit (48).

24 Claims, 2 Drawing Sheets

U.S. PATENT DOCUMENTS

| | | |
|---|---|---|
| 5,246,594 A | 9/1993 | Stegemann et al. |
| 6,306,197 B1 | 10/2001 | Boyce et al. |
| 2003/0206846 A1 * | 11/2003 | Jangbarwala ................ 423/241 |

FOREIGN PATENT DOCUMENTS

| | | |
|---|---|---|
| GB | EP 680932 A2 * | 11/1995 |
| JP | 2000079319 A | 9/1998 |
| JP | 2005013788 A | 6/2003 |
| WO | 01/08786 A1 | 2/2001 |
| WO | 2004/063101 A1 | 7/2004 |

* cited by examiner

METHOD OF TREATING A GAS SYSTEM

FIELD OF THE INVENTION

The present invention relates to a method of, and apparatus for, treating a gas stream.

BACKGROUND

Chemical vapour deposition (CVD) is used to deposit thin films or layers on the surface of a substrate or wafer located in a deposition chamber. This process operates by supplying one or more reactive gases to the chamber, often using a carrier gas, to the substrate's surface under conditions that encourage chemical reactions to take place at the surface. For example, TEOS and one of oxygen and ozone may be supplied to the deposition chamber for the formation of a silicon oxide layer on the substrate, and silane and ammonia may be supplied for the formation of a silicon nitride layer. Polycrystalline silicon, or polysilicon, is deposited on the substrate by the decomposition of silane or a shlorosilane by heat.

Gases are also supplied to an etch chamber to perform selective etching of areas of the deposited layers, for example during the formation of electrodes and the source and drain regions of a semiconductor device. Etching gases can include the perfluorinated (PFC) gases such as $CF_4$, $C_2F_6$, $C_3F_8$, and $C_4F_8$, although other suitable etchants include fluorine, $NF_3$, $SF_6$ and hydrofluorocarbon gases, such as $CHF_3$, $C_2HF_5$ and $CH_2F_2$. Such gases are commonly used to form an opening in a region of a nitride or oxide layer formed over a polysilicon layer and which is exposed by a photoresist layer. Argon is generally also conveyed to the chamber with the etching gas to provide a facilitating gas for the process being conducted in the etch chamber.

During such an etch process, there is typically a residual amount of the gas supplied to the etch chamber contained in the exhaust gas drawn from the etch chamber by a vacuum pump, together with by-products from the etching process, such as $SiF_4$ and $COF_2$, and inert gases such as Ar. Additional nitrogen is often added to the exhaust gas as a purge gas for the vacuum pump.

The perfluorinated gases mentioned above are greenhouse gases, and so before the exhaust gas is vented to the atmosphere, an abatement device such as a thermal processing unit (TPU) or plasma abatement device is provided to convert the PFC gases into water-soluble hydrogen fluoride, and to convert $SiF_4$ into $SiO_2$. The gas stream is subsequently conveyed to a scrubbing unit, wherein the HF is dissolved in water supplied to the scrubbing unit.

Our co-pending US patent application 2006/0101995 A1, the contents of which are incorporated herein by reference, describes apparatus for subsequently treating the acidic HF solution formed in the scrubbing unit. The HF solution is conveyed to an acid removal unit, preferably in the form of an electrochemical cell, for removing HF from the acidic solution. The acid removal unit returns water to the scrubbing unit, and discharges the HF in a concentrated HF solution. This solution may be subsequently treated using calcium salts to precipitate $CaF_2$, which may be compacted and dried for further use.

Solid particulates, such as $SiO_2$ particulates, that are entrained within the gas stream entering the scrubbing unit are transferred to the water passing through the scrubbing unit. Some of the $SiO_2$ particulates, for example around 30 to 60 ppm, will dissolve in the water passing through the scrubbing unit, whilst the remainder will remain as solid particulates within the water. In order to prevent these particulates from building up inside the electrochemical cell and/or the scrubbing unit, one or more filter cartridges or similar devices are provided upstream from the cell to remove these particulates from the HF solution discharged from the scrubbing unit.

Depending on the processes being conducted within the process chamber, the amount of solid particulates entrained within the gas stream may vary, typically between 70 and 200 ppm. We have found that when the amount of solid particulates is relatively high, the filter cartridges can become rapidly filled. For example, four filter cartridges each having a capacity of around 4 to 5 kg can become filled within less than a week when the gas stream contains 200 ppm of $SiO_2$ particulates. As the cost of replacing each cartridge is currently around US$200, this can add significantly to the cost of ownership of the treatment apparatus.

SUMMARY

The present invention provides a method of treating a gas stream containing an acid and solid particulates, the method comprising the steps of circulating an aqueous scrubbing liquor through an essentially closed loop comprising an acid removal unit for reducing the acidity of the liquor, supplying at least a portion of the circulating liquor to a gas scrubbing unit, supplying the gas stream to the scrubbing unit, monitoring the acidity of the liquor to be supplied to the scrubbing unit, and controlling the reduction of the acidity of the liquor depending upon the monitored acidity to control the solubility of the solid component of the gas stream within said at least a portion of the circulating liquor.

The present invention also provides a method of treating a gas stream containing an acid and solid particulates, the method comprising the steps of circulating an aqueous scrubbing liquor through an essentially closed loop comprising an electrochemical unit for reducing the acidity of the liquor, diverting a proportion of the circulating liquor away from the closed loop to a gas scrubbing unit, supplying the gas stream to the scrubbing unit for dissolution in the diverted liquor, returning the diverted liquor to the closed loop, monitoring the acidity of the circulating liquor at a location within the closed loop, and controlling the reduction of the acidity of the liquor depending upon the monitored acidity to control the solubility of the solid component of the gas stream within the diverted liquor.

By controlling the acidity of the scrubbing liquor entering the scrubbing unit, and especially the acidity resulting from the acid contained in the gas stream, the solubility of solid particulates within the scrubbing liquor may be significantly increased. The greater the acidity, the more soluble the particulates may be in the scrubbing liquor. For example, silicide particulates, such as $SiO_2$ particulates, within a gas stream containing HF may be dissolved in a hydrofluoric acid solution to form a fluorosilicate. This fluorosilicate can be subsequently removed from the scrubbing liquor, along with some of the acid, by the electrochemical cell. Consequently, the lifetime of any filter cartridges or other devices provided in the closed loop for removing solid particulates from the scrubbing liquor may be significantly increased. Whilst the benefit of the invention may be realised with any acid, HF has the greatest impact on the solubility of $SiO_2$ through the formation of fluorosilicates rather than silicic acid.

The acidity of the diverted liquor is preferably maintained at or above a to predetermined value. By way of example, if the acid within the gas stream is HF, the concentration of HF within the diverted liquor may be maintained at or above 400 ppm so that concentrations of $SiO_2$ of around 200 ppm may be substantially fully dissolved within the liquor.

The acidity of the circulating liquor may be monitored at any convenient location. For example, the acidity may be monitored immediately upstream or downstream from the location at which a proportion of the circulating liquor is diverted to the scrubbing unit. The diverted liquor may be returned to a storage vessel located in the closed loop and in which the diverted liquor mixes with liquor discharged from the electrochemical unit. In this case, the acidity of the liquor stored within the storage vessel may be monitored. The storage vessel may be provided with a fluid inlet port through which water enters the closed loop.

The acidity of the liquor may be monitored by measuring the conductivity of the liquor. Through knowledge of the composition of the gas stream, the contribution of the acidic gases to the conductivity of the liquor may be estimated, and so the conductivity of the liquor can provide an indication of the acidity of the liquor. Alternatively, a more accurate measurement of the acidity of the liquor may be obtained using an on-line acidity analyser, which is preferably a halide analyser when the acid contained in the gas stream is HF or HCl.

In the preferred embodiment, the electrochemical unit comprises an electrochemically regenerated ion exchange unit. The unit preferably comprises an ion exchange material for absorbing selected ions from the liquor and across which an electric field is applied to cause the absorbed ions to migrate through the ion exchange material into a separate, concentrate solution, and wherein the strength of the electric field is adjusted depending upon the monitored concentration. The concentrate solution may be circulated through the electrochemical unit. Periodically, a proportion of the concentrate solution may be conveyed to a reaction unit in which ionic species, such as acids and fluorosilicates, within the solution are rendered insoluble.

The ion exchange material serves to capture the ions of interest and is preferably an ion exchange resin in the form of particles or beads or other materials that can provide a water permeable medium, an ion adsorption medium and an ion conducting medium whereby the ions may be moved by the imposed electrical field into the concentrate solution. The particles or beads of the resin may be loose and held in place between two membranes and inlet and outlet sinters so as to be permeable to the liquor containing the ions. Alternatively, the particles or beads may be in a coherent form, bound together with a binder. The electrical potential which is applied across, for example, the thickness of the ion exchange material serves to drive the captured ions through the ion exchange material towards one or other of a pair of electrodes through which the potential is applied. Adjusting the magnitude of the electrical potential, or the current flow, between the electrodes can adjust the migration rate of the captured ions through the ion exchange material into the concentrate solution, which in turn controls the adsorption rate of ions from the scrubbing liquor and thus the acidity of the liquor discharged from the electrochemical unit into the closed loop.

The method of the invention is applicable to the treatment of gas streams comprising a wide variety of acids, such as at least one of HF, HCl, $HNO_3$, $H_2SO_4$, $H_3BO_3$, and $H_3PO_4$.

The present invention also provides apparatus for treating a gas stream containing an acid and solid particulates, comprising a gas scrubbing unit, an essentially closed loop circulation system comprising a pump for circulating an aqueous scrubbing liquor around the closed loop, an electrochemical unit for reducing the acidity of the circulating liquor, and an exit port for diverting a proportion of the circulating liquor away from the closed loop to the gas scrubbing unit, the gas scrubbing unit having a first inlet for receiving the diverted liquor, a second inlet for receiving the gas stream for dissolution in the diverted liquor, and an outlet through which the diverted liquor is discharged from the scrubbing unit, the closed to loop having an entry port for receiving liquor discharged from the scrubbing unit; a device for monitoring the acidity of the liquor at a location within the closed loop, and a controller for controlling the reduction of the acidity of the liquor depending upon the monitored concentration to control the solubility of the solid component of the gas stream within the diverted liquor.

Features described above in relation to method aspects of the invention are equally applicable to the apparatus aspect, and vice versa.

BRIEF DESCRIPTION OF THE DRAWINGS

Preferred features of the present invention will now be described with reference to the accompanying drawing, in which.

DETAILED DESCRIPTION

Figure 1:
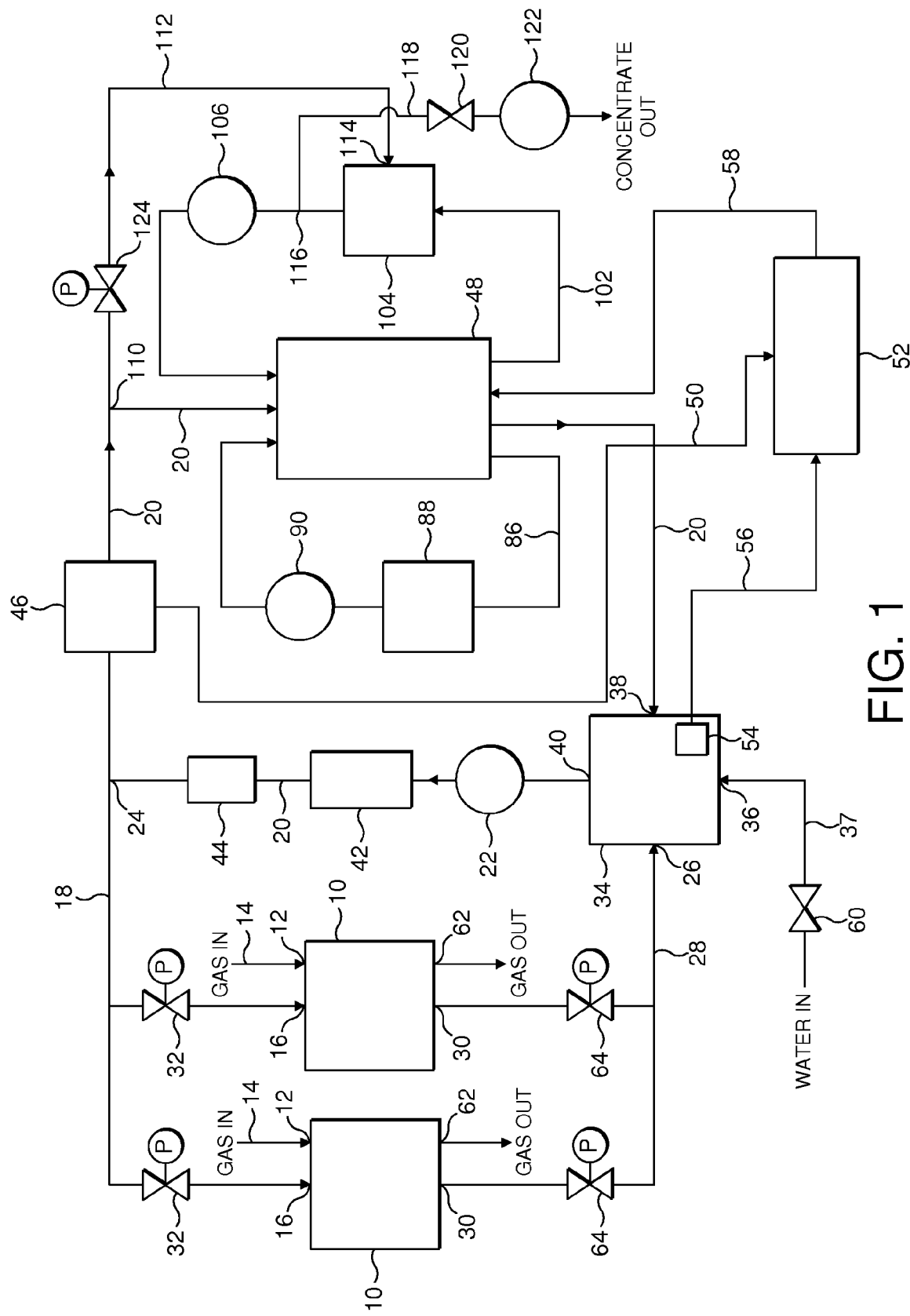
FIG. 1 illustrates schematically an apparatus for treating a gas stream.

FIG. 1 illustrates apparatus for treating a gas stream exhausted from a process chamber of a semiconductor manufacturing facility. The apparatus comprises at least one scrubbing unit 10 having a gas inlet port 12 for receiving the gas stream from conduit 14. In practice, the apparatus preferably comprises four or more scrubbing units 10 arranged in parallel for receiving the gas stream, so that when one scrubbing unit 10 is off line for any reason, the gas stream continues to be received by the other scrubbing units 10. However, for simplicity purposes only FIG. 1 illustrates two scrubbing units 10.

In this example, the gas stream is exhausted from a process chamber of a plasma etch reactor, to which process gases comprising an etchant and oxygen are supplied as reactants for the process being conducted in the chamber. Examples of suitable etchant include the perfluorinated compounds having the general formula $C_xF_yH_z$ where $x \geq 1$, $y \geq 1$ and $z \geq 0$, such as $CF_4$, $C_2F_6$, $C_3F_8$, $C_4F_8$, $CHF_3$, $C_2HF_5$ and $CH_2F_2$. Other suitable etchants include $NF_3$, and $SF_6$. Argon may also be supplied as a facilitating gas for the process being conducted in the chamber.

During the etching process, only a portion of the reactants will be consumed, and so the gas stream exhausted from the process chamber will contain a mixture of the reactants, any unreactive noble gases supplied to the chamber, and by-products from the etch process. For example, the gas stream may contain a mixture of $C_xF_yH_z$, $O_2$, Ar, $SiF_4$, and $COF_2$. The perfluorinated gases mentioned above are water-insoluble, and so before the gas stream is conveyed to the scrubbing units 10, it is passed through an abatement device (not shown) such as a thermal processing unit (TPU) or plasma abatement device to convert the perfluorinated gases to water-soluble acid HF. Any $SiF_4$ in the gas stream will be converted to $SiO_2$, which becomes entrained within the gas stream in the form of solid particulates. Alternatively, the scrubbing unit 10 may be provided by a combination of a TPU and a wet scrubber, and so no separate abatement device may be required.

Aqueous scrubbing liquor is supplied to a fluid inlet port 16 of each scrubbing unit 10 by a supply conduit 18. As illustrated in FIG. 1, the apparatus includes an essentially closed loop 20 within which scrubbing liquor is continuously circulated by a pump 22. The closed loop 20 has an exit port 24 through which a proportion of the circulating liquor can be diverted into the supply conduit 18, and an entry port 26 through which the diverted liquor is subsequently returned to the closed loop by a return conduit 28 connected to a fluid outlet port 30 of each scrubbing unit 10. In this example, circulating scrubbing liquor is diverted into the supply conduit 18 by the actuation of a supply valve 32 located between the supply conduit 18 and a respective fluid inlet port 16.

The closed loop 20 comprises a fluid storage vessel or tank 34 having three fluid inlet ports. The first fluid inlet port 36 receives water from a water supply conduit 37 for initially making up the scrubbing liquor that is circulated within the closed loop 20. The second fluid inlet port 38 receives the circulating liquor from the closed loop 20. The entry port 26 of the closed loop 20 provides the third fluid inlet port. The tank 34 further comprises a fluid outlet port 40 through which liquor is returned to the closed loop 20.

The liquor that enters the closed loop 20 from the tank 34 passes, in turn, through the pump 22 that circulates the liquor within the closed loop 20, one or more filter units 42 for removing particulates from the liquor, a heat exchanger 44, a fluid analyser 46, and an acid removal unit 48 for reducing the acidity of the liquor, before being returned to the tank 34.

The fluid analyser 46 monitors the acidity of the circulating liquor that is diverted through the exit port 24 to the supply conduit 18. In this example, the fluid analyser 46 is located immediately downstream from the exit port 24 so that the acidity of the liquor passing through the fluid analyser 46 will be the same as that of any liquor that is diverted through the exit port 24. Alternatively, the fluid analyser 46 may be located immediately upstream from the exit port 24 so that, again, the acidity of the liquor passing through the fluid analyser 46 will be the same as that of any liquor that is diverted through the exit port 24. In this example, an on-line halide analyser provides the fluid analyser 46. The fluid analyser 46 outputs a signal 50 that is indicative of the acidity of the liquor passing therethrough, which signal 50 is received by a controller 52.

As an alternative to using a fluid analyser 46 to monitor the acidity of the circulating liquor, a conductivity sensor 54 may be provided in the tank 34 for monitoring the conductivity of the liquor stored in the tank 34, and thus the conductivity of the liquor which is pumped out from the fluid outlet 40 of the tank by the pump 22. The sensor 54 may output to the controller 52 a signal 56 that is indicative of the conductivity of the liquor within the tank 34. The conductivity of the liquor can provide an indication of the acidity of the liquor when the composition of the gas stream entering the scrubbing units 10, and thus the composition of the circulating liquor, is known. The controller 52 uses the information contained in the signal 50 or 56 to generate a control signal 58 that is supplied to the acid removal unit 48 to control the reduction in the acidity of the circulating liquor.

In operation, valve 60 in the water supply conduit 37 is initially opened to supply an amount of water, for example 160 liters, into the tank 34. The supply valves 32 are initially closed. Once the tank 34 has been supplied with the required amount of water, valve 60 is closed and pump 22 operated to circulate the water within the closed loop 20. Consequently, the scrubbing liquor initially circulating within the closed loop 20 is water.

The supply valves 32 are subsequently opened so that a proportion of the circulating scrubbing liquor, for example around 10 liters, is diverted through the exit port 24 into supply conduit 18 into each scrubbing unit 10. Each supply valve 32 is closed when the required amount of scrubbing liquor has entered its respective scrubbing unit 10. For example, a first level switch (not shown) may be located in the scrubbing unit 10 for outputting an actuation signal to the supply valve 32 when the level of liquor within the scrubbing unit 10 has reached this switch, in response to which the supply valve 32 closes.

The gas stream exhausted from the abatement device (not shown) is conveyed through the gas conduit 14 and enters the scrubbing units 10 through the gas inlet ports 12. The gas contacts the scrubbing liquor within the scrubbing units 10, with the acidic HF being dissolved in the scrubbing liquor. Initially, as the acidity of the scrubbing liquor is relatively low, any $SiO_2$ particulates within the gas stream are transferred to the scrubbing liquor. Undissolved gas is discharged from the scrubbing units 10 through gas outlet ports 62 to the atmosphere.

The scrubbing liquor within the scrubbing units 10 is periodically discharged back to the closed loop 20, and replaced with fresh scrubbing liquor from the closed loop 20. As illustrated in FIG. 1, return valves 64 are provided for controlling the discharge of scrubbing liquor from each scrubbing unit 10. The opening of each return valve 64 may be controlled using a timer (not shown) so that each return valve 64 is periodically opened, for example at a frequency between 100 and 700 seconds. When a return valve 64 is opened, the—now relatively acidic—scrubbing liquor enters the return conduit 28 and is returned to the tank 34 through entry port 26. The return valve 64 is closed when the required amount of scrubbing liquor, for example around 10 liters, has been discharged from the scrubbing unit 10. For example, a second level switch (not shown) may be located in the scrubbing unit 10 beneath the first level switch for outputting an actuation signal to the return valve 64 when the level of liquor within the scrubbing unit 10 has fallen to this second level switch, in response to which the return valve 64 closes. As the return valve 64 closes, the supply valve 32 associated with that scrubbing unit 32 is opened so that fresh scrubbing liquor is diverted from the closed loop 20 into the scrubbing unit 10 until the level of liquor within the scrubbing unit 10 reaches the first level switch, whereupon the supply valve 32 closes.

The operation of the supply valves 32 and the return valves 64 of the scrubbing units 10 may be synchronised so that, at any given time, the supply valve 32 of one scrubbing unit 10 is open and the return valve 64 of another scrubbing unit 64 is open. With the valves 32, 64 operated in this manner, there will be a continuous diversion of scrubbing liquor through the exit port 24, and a continuous return of scrubbing liquor through the entry port 26. Alternatively, there may be periods in which no scrubbing liquor is being diverted to, or returned from, the scrubbing units 10.

The relatively acidic scrubbing liquor that is discharged from the scrubbing units 10 enters the closed loop 20 through the entry port 26 in the tank 34, wherein it mixes with the circulating liquor entering the tank 34 through the second fluid inlet port 38. Consequently, the acidity of the liquor that enters the closed loop through the fluid outlet port 40 of the tank 34 gradually increases as more liquor is discharged from the scrubbing units 10.

The acidity of the circulating liquor is monitored by the fluid analyser 46, which supplies a signal 50 to the controller 52 indicative of the acidity of the liquor at the exit port 24 of the closed loop 20. In response to the received signal, the controller 52 controls the reduction of the acidity of the circulating liquor by the acid removal unit 48 by issuing appropriate control signals 58 to the acid removal unit 48. The purpose of this control of the acid removal unit 48 is to control the solubility within the liquor located in the scrubbing units 10 of the solid $SiO_2$ particulates that are entrained within the gas stream entering the scrubbing units 10.

As discussed above, initially the acidity of the scrubbing liquor within the scrubbing units 10 will be relatively low and so the solubility of $SiO_2$ particulates within the liquor will also be relatively low. Consequently, the solids content of the scrubbing liquor discharged from the scrubbing units 10 will initially be relatively high. These solids enter the closed loop 20, and become trapped by the filter units 42. At this stage, the rate of reduction of the acidity of the circulating liquor by the acid removal unit 48 will be relatively low.

As the acidity of the circulating liquor rises, due to the entry into the closed loop 20 of the relatively acidic scrubbing liquor discharged from the scrubbing units, the solubility of $SiO_2$ particulates in the liquor diverted to the scrubbing units 10 will also rise. As a result, the scrubbing liquor subsequently discharged from the scrubbing units 10 will contain an increasing amount of dissolved fluorosilicates and a decreasing amount of $SiO_2$ particulates. This enables the lifetime of the filter units 42 to be significantly prolonged.

As the acidity of the circulating liquor continues to rise, the rate of reduction of the acidity of the circulating liquor by the acid removal unit 48 is adjusted until a steady state is reached at which the acidity of the liquor passing through the fluid analyser 46 is maintained at a relatively steady level at or above a chosen acidity. This acidity is chosen so that the solubility of the $SiO_2$ particulates in the liquor within the scrubbing units 10 will be relatively high, and so that the acidity is not too high so as to significantly decrease the service life of the apparatus. For example, if the concentration of $SiO_2$ particulates within the gas stream is around 200 ppm, the concentration of HF within the diverted liquor is preferably maintained at or above 400 ppm.

Figure 2:
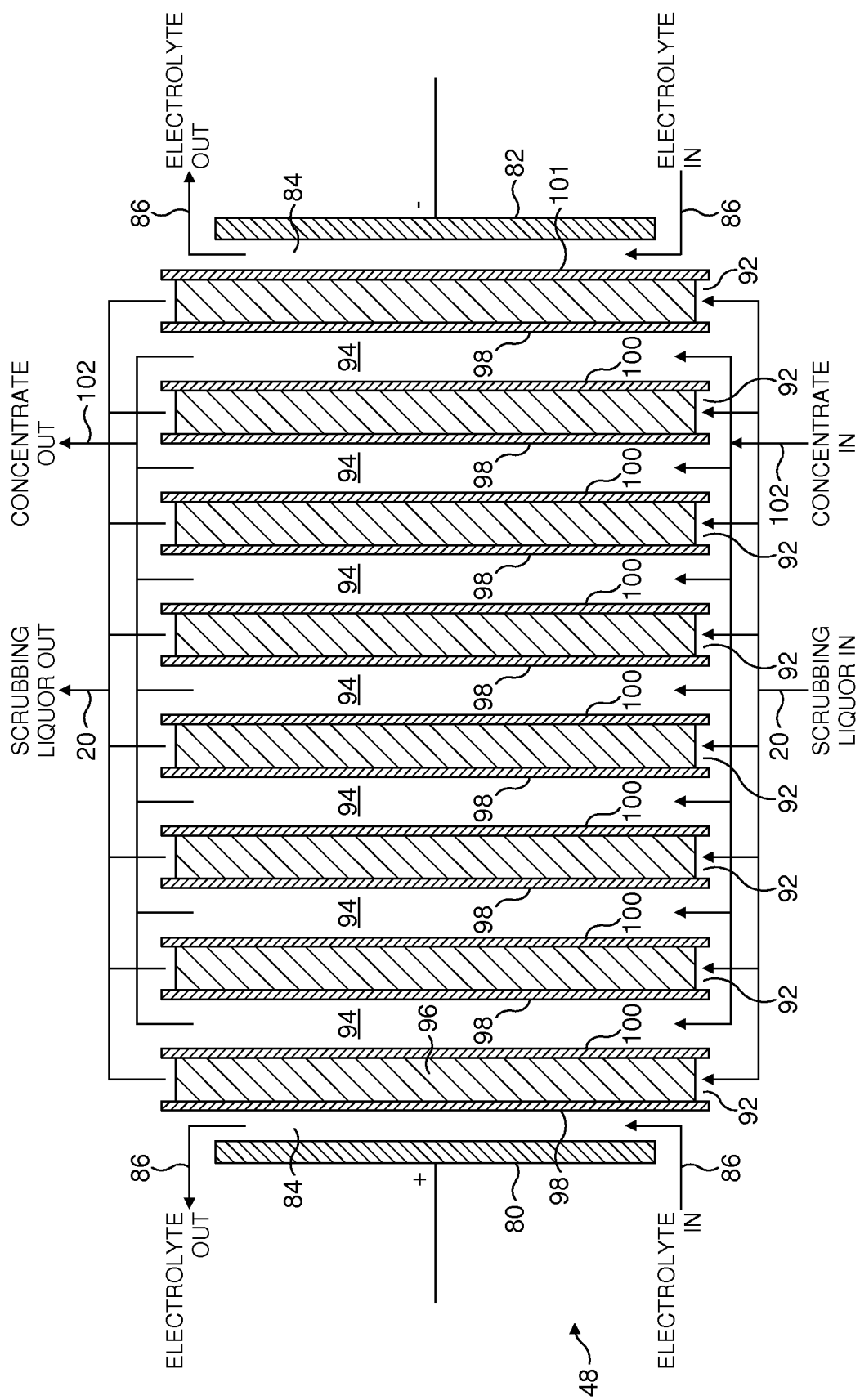
FIG. 2 illustrates schematically an acid removal unit suitable for use in the apparatus of FIG. 1.

The structure and operation of one example of a suitable acid removal unit 48 for used in the apparatus will now be described with reference to FIG. 2. Other examples of suitable acid removal units are described in our co-pending US patent application 2006/0101995 A1, the contents of which are incorporated herein by reference.

The acid removal unit 48 is in the form of an electrochemical unit, and in this example is an electrochemically regenerated ion exchange unit. The unit 48 comprises an anode 80 and a cathode 82 on opposite sides of the unit 48. These electrodes 80, 82 are bathed in an electrolyte that is fed into two opposing electrode channels 84 of the unit 48. With reference to FIG. 1, the electrolyte is fed into the electrode channels 84 from an electrolyte closed loop 86 comprising an electrolyte storage tank 88 and an electrolyte pump 90 for continuously circulating the electrolyte within the electrolyte closed loop 86. The electrolyte may comprise an aqueous solution containing 0.25% phosphoric acid for inhibiting corrosion of the cathode 82.

Between the electrode channels 84, the unit 84 comprises an array of alternately arranged ion removal channels 92 and concentrate channels 94. The ion removal channels 92 are internally manifolded to receive the scrubbing liquor from the closed loop 20, and to return the scrubbing liquor, with a reduced acidity, to the closed loop 20. Each of the ion removal channels 92 comprises ion exchange material 96, which may comprise an intimate mixture of an ion exchange resin beads. In this example, the beads of ion exchange resin comprise anion exchange sites for attracting selected anions, which in this example include fluoride and fluorosilicate ions, contained within the scrubbing liquor passing through the ion removal channels 92. However, a mixture of anionic and cationic beads may be provided.

With the exception of the ion removal material 96 closest to the cathode 82, the ion exchange material 96 is bounded on one side by an anion permeable membrane 98, and on the other side by a cation permeable membrane 100. These membranes 98, 100 are relatively thin, and operate in such a manner that selected ions are capable of passing through the membrane by migrating from one ion exchange site to another whilst inhibiting the passage of water and other non-ionic molecules through the membrane. The ion removal material 96 closest to the cathode 82 is bounded on one side by an anion permeable membrane 98, and on the other side by a bipolar permeable membrane 101.

The concentrate channels 94 are similarly internally manifolded, and receive an aqueous concentrate solution from a concentrate closed loop 102 comprising a concentrate storage vessel 104 and a concentrate pump 106 for continuously circulating the concentrate solution within the concentrate closed loop 102. The pressure of the scrubbing liquor passing through the ion removal channels 92 is greater than the pressure of the concentrate solution passing through the concentrate channels 94 so that there may be a relatively small leakage of scrubbing liquor into the concentrate channels 94, and also into the electrode channels 84. This serves to prevent the concentrate solution and the electrolyte from passing through the membranes 98, 100 into the scrubbing liquor. Osmosis will also tend to cause some water to move from the scrubbing liquor into the concentrate solution.

In use, the ion exchange material 96 within the ion exchange channels 92 absorbs fluoride and fluorosilicate ions contained within the scrubbing liquor entering the unit 48. The controller 58 applies a potential difference between the electrodes 80, 82 to generate an electric field across the thickness of the ion exchange material 96 within each ion removal channel 92. Under the influence of the electric field, water is dissociated to generate hydrogen ions, which are driven by the applied electric field through the array of channels towards the cathode 82, and hydroxide ions, which are driven by the applied electric field through the array of channels towards the cathode 80.

These generated ions migrate along the path of least resistance through the ion exchange material, wherein the generated ions displace the ions that have been absorbed from the scrubbing liquor. In other words, within each ion removal channel 92 the generated hydroxide ions displace the absorbed fluoride and fluorosilicate ions to regenerate the ion exchange material. The displaced anions migrate through the thickness of the ion exchange material 96 and pass through the cation permeable membrane 98 into a concentrate channel 94. The anions are prevented from migrating further through the array by the cation permeable membrane 100 bounding the concentrate channel 94, and so are conveyed out from the unit 48 within the concentrate solution passing through the concentrate channels 94.

The rate at which the anions migrate from the ion removal channels 92 into the concentrate channels 94, and therefore the extent to which the acidity of the scrubbing liquor is reduced by the unit 48 is dependent, inter alia, upon the electrochemical driving force which causes the anions to move through the ion exchange material 96. Consequently, the controller 58 is able to adjust the magnitude of the electrical field generated between the electrodes 80, 82 is order to control the reduction in the acidity of the liquor passing through the unit 48.

As the acid removal unit 48 operates to remove acid from the circulating scrubbing liquor, the acidity of the concentrate solution located within the concentrate tank 104 will gradually increase. In order to control the acidity of the concentrate solution, an amount of the concentrate solution is periodically discharged from the closed loop 102. Returning to FIG. 1, the closed loop 20 within which the scrubbing liquor is circulated has a second exit port 110 located between the analyser 46 and the acid removal unit 48. A liquor supply conduit 112 extends between the second exit port 110 and an inlet port 114 of the concentrate tank 102. The concentrate closed loop 102 has an exit port 116 located between the concentrate tank 104 and the concentrate pump 106. A concentrate discharge conduit 118 extends from the exit port 116, and contains a discharge valve 120 and a discharge pump 122. Actuation of the discharge valve 120 is controlled by high and low level switches located in the concentrate tank 104, between which the level of concentrate solution in the concentrate tank 104 is normally maintained.

When the total amount of scrubbing liquor that has been discharged from the scrubbing units 10 has reached a certain value, for example around 100 liters, valve 124 located within the liquor supply conduit 112 is opened so that scrubbing liquor is diverted from the closed loop 20 into the concentrate tank 104. When the level of the concentrate solution in the concentrate tank 104 has reached the high level switch in the tank 104, valve 124 is closed, and discharge valve 120 is opened so that concentrate solution is pumped out from the concentrate closed loop 102 through the discharge conduit 120. When the level of concentrate solution within the concentrate tank 104 has fallen to the low level switch, for example after around 10 liters of concentrate solution has been discharged through the discharge conduit 118, valve 120 is closed. The discharged concentrate solution may be removed from the apparatus for further treatment.

Periodic discharging of concentrate solution in this manner will gradually reduce the amount of scrubbing liquor circulating within the closed loop 20. In view of this, the tank 34 is also provided with high and low level switches. When the level of the scrubbing liquor within the tank 34 has fallen to the low level switch, valve 60 is opened to permit water to be supplied into the tank through the first fluid inlet port 36. The valve 60 is closed when the level of scrubbing liquor within the tank 34 has reached the high level switch.

We claim:

1. A method of treating a gas stream containing an acid and solid particulates, the method comprising steps of:
    circulating an aqueous scrubbing liquor through an essentially closed loop comprising an acid removal unit for reducing acidity of the liquor;
    supplying at least a portion of the circulating liquor to a gas scrubbing unit;
    supplying the gas stream to the scrubbing unit;
    monitoring the acidity of the liquor to be supplied to the scrubbing unit at a location upstream of the acid removal unit; and
    controlling the reduction of the acidity of the liquor depending upon the monitored acidity to control a solubility of a solid component of the gas stream within said at least a portion of the circulating liquor.

2. The method according to claim 1, wherein said at least a portion of the circulating liquor is diverted away from the closed loop, and is subsequently returned to the closed loop.

3. The method according to claim 1, wherein the acid removal unit is an electrochemical unit.

4. A method of treating a gas stream containing an acid and solid particulates, the method comprising steps of:
    circulating an aqueous scrubbing liquor through an essentially closed loop comprising an acid removal unit for reducing acidity of the liquor;
    diverting a proportion of the circulating liquor away from the closed loop to a gas scrubbing unit;
    supplying the gas stream to the scrubbing unit for dissolution in the diverted liquor;
    returning the diverted liquor to the closed loop;
    monitoring the acidity of the circulating liquor at a location upstream of the acid removal unit within the closed loop; and
    controlling the reduction of the acidity of the liquor depending upon the monitored acidity to control a solubility of a solid component of the gas stream within the diverted liquor.

5. The method according to claim 4, wherein the acidity of the diverted liquor is maintained at or above a predetermined value.

6. The method according to claim 5, wherein the acid is HF, and a concentration of HF within the diverted liquor is maintained at or above 400 ppm.

7. The method according to claim 4, wherein the acidity of the liquor is monitored at a location downstream from a location at which the liquor is diverted to the scrubbing unit.

8. The method according to claim 7, wherein the diverted liquor is returned to a storage vessel located in the closed loop and in which the diverted liquor mixes with liquor discharged from the electrochemical unit.

9. The method according to claim 7, wherein the electrochemical unit comprises an electrochemically regenerated ion exchange unit.

10. The method according to claim 7, wherein the electrochemical unit comprises an ion exchange material for absorbing selected ions from the liquor, and across which an electric field is applied to cause the absorbed ions to migrate through the ion exchange material into a separate solution, and wherein a strength of the electric field is adjusted depending upon a monitored concentration.

11. The method according to claim 4, wherein the solid component of the gas stream is a silicon-based component of the gas stream.

12. The method according to claim 4, wherein the solid component of the gas stream is silicon dioxide.

13. The method according to claim 4, wherein the acidity of the liquor is monitored by measuring the conductivity of the liquor.

14. The method according to claim 4, wherein the acid comprises a halide, and wherein the acidity of the liquor is monitored using an on-line acidity analyser including a halide analyser.

15. The method according to claim 4, wherein the acid comprises at least one acid selected from the group consisting of HF, HCl, $HNO_3$, $H_2SO_4$, $H_3BO_3$, and $H_3PO_4$.

16. Apparatus for treating a gas stream containing an acid and solid particulates, comprising:
    a gas scrubbing unit;
    an essentially closed loop circulation system comprising a pump for circulating an aqueous scrubbing liquor around the closed loop, an electrochemical unit for reducing the acidity of the circulating liquor, and an exit port for diverting a proportion of the circulating liquor away from the closed loop to the gas scrubbing unit;
    the gas scrubbing unit having a first inlet for receiving the diverted liquor, a second inlet for receiving the gas stream for dissolution in the diverted liquor, and an outlet through which the diverted liquor is discharged from the scrubbing unit, the closed loop having an entry port for receiving liquor discharged from the scrubbing unit;

a device for monitoring the acidity of the liquor at a location upstream of the electrochemical unit within the closed loop; and a controller for controlling the reduction of the acidity of the liquor depending upon a monitored concentration to control a solubility of a solid component of the gas stream within the diverted liquor.

17. Apparatus according to claim 16, wherein the controller is configured to maintain the acidity of the diverted liquor at or above a predetermined value.

18. Apparatus according to claim 17, wherein the controller is configured to maintain a concentration of HF within the diverted liquor at or above 400 ppm.

19. Apparatus according to claim 16, wherein the device is located within the closed loop downstream from the exit port.

20. Apparatus according to claim 16, wherein the entry port is located within a storage vessel provided in the closed loop and in which the liquor discharged from the scrubbing unit mixes with liquor discharged from the electrochemical unit.

21. Apparatus according to claim 16, wherein the device is configured to measure the conductivity of the liquor.

22. Apparatus according to claim 16, wherein the device is an on-line acidity analyser including a halide analyser.

23. Apparatus according to claim 19, wherein the electrochemical unit comprises an electrochemically regenerated ion exchange unit.

24. Apparatus according to claim 19, wherein the electrochemical unit comprises an ion exchange material for absorbing selected ions from the liquor, and across which an electric field is applied to cause the absorbed ions to migrate through the ion exchange material into a separate solution, and wherein the controller is configured to adjust the strength of the electric field depending upon the monitored concentration.

* * * * *